United States Patent [19]

McGrath

[11] 4,043,774
[45] Aug. 23, 1977

[54] APPARATUS FOR AIR PURIFICATION

[76] Inventor: Doyle Wayne McGrath, 135 Abbeyville Road, Abbeyville Apt. No. 204, Pittsburgh, Pa. 15228

[21] Appl. No.: 680,589

[22] Filed: Apr. 26, 1976

[51] Int. Cl.² .................. B01D 53/04; B01D 53/26
[52] U.S. Cl. .................. 55/269; 55/316; 55/319; 55/322; 55/387
[58] Field of Search .......... 55/23, 29, 30, 33, 268, 55/315, 316, 318, 319, 387, 389, 269, 322

[56] References Cited

U.S. PATENT DOCUMENTS

| 1,634,931 | 7/1927 | Cole | 55/268 |
| 2,548,335 | 4/1951 | Balogh | 55/316 |
| 3,063,259 | 11/1962 | Hankison et al. | 55/268 X |
| 3,152,877 | 10/1964 | Kaufman | 55/30 |
| 3,395,511 | 8/1968 | Akerman | 55/23 |
| 3,417,547 | 12/1968 | Rapp | 55/269 X |
| 3,453,809 | 7/1969 | Henderson | 55/269 |
| 3,864,102 | 2/1975 | Powers | 55/30 |

FOREIGN PATENT DOCUMENTS 1,150,952  5/1969  United Kingdom .................. 55/23

Primary Examiner—Thomas G. Wyse
Assistant Examiner—Robert H. Spitzer
Attorney, Agent, or Firm—Webb, Burden, Robinson & Webb

[57] ABSTRACT

An air purification unit for use in a compressed air system, said unit including a chamber having a plurality of serially connected sections located therein, said sections comprising a heat transfer section, a filter and expansion section, a supply reservoir section and a drying section, each section having an inlet and an outlet, the outlet of said heat transfer section connected with the inlet of said filter and expansion section, the outlet of said filter and expansion section connected to the inlet of said supply reservoir section, and the outlet of said supply reservoir section connected with the inlet of said drying section.

8 Claims, 5 Drawing Figures

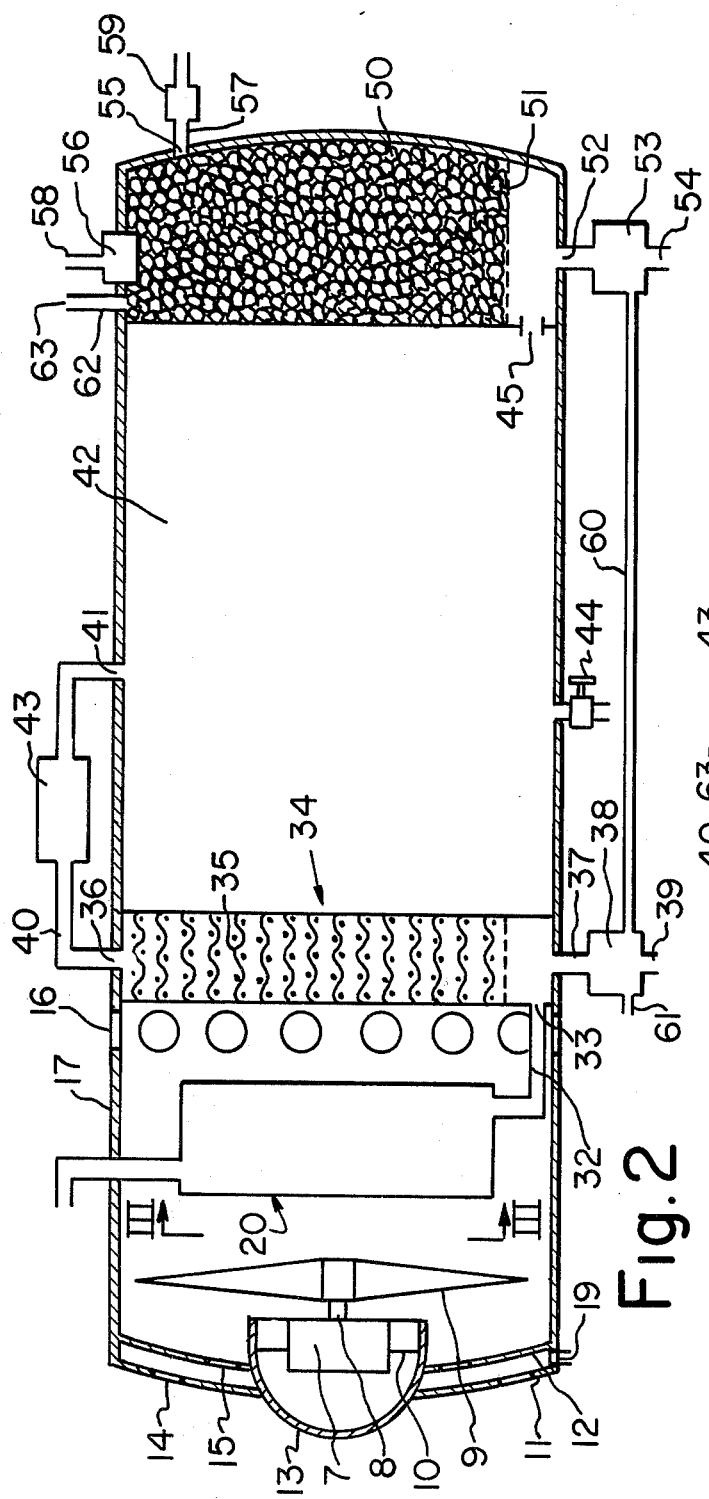
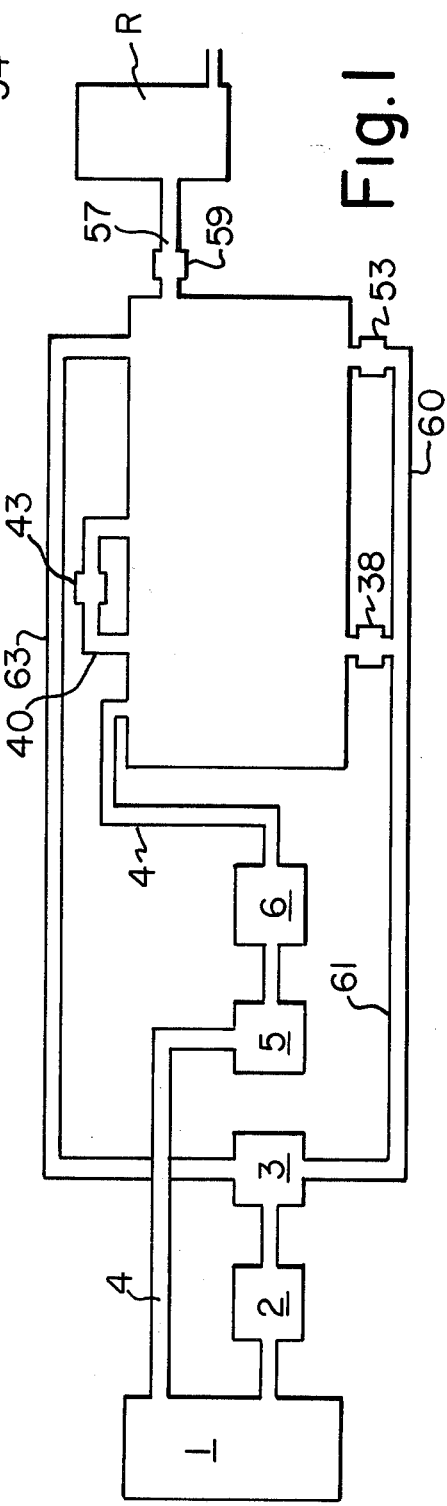
Fig. 1
Fig. 2

APPARATUS FOR AIR PURIFICATION

This invention relates generally to purifying air and, more particularly, to the removal of contaminants from compressed air supplied from a compressor to a compressed air system.

The present invention has an important application in the compressed air system of a vehicle wherein numerous devices are air actuated. For example, the starter, the lubrication system, the suspension system and the brake system may all be operated by pressurized air. In many large vehicles approximately one half of the compressor output is utilized in the brake system, and it is extremely important that this system does not malfunction. My invention has particular application in the air brake system of a vehicle and is an important safety feature on a vehicle. Most vehicle compressed air systems in use today include at least two air reservoirs which are referred to according to their function as a supply reservoir and a service reservoir. Air from the service reservoir operates the various air actuated devices on the vehicle, and air from the supply reservoir supplies the service reservoir to insure a constant supply of compressed air.

Air actuated devices on a vehicle may be rendered partially or totally inoperative by solid or liquid contaminants which are carried through the system to the device by the compressed air. Liquid contaminants in the pressurized air are especially prevalent in geographic areas where high humidity accompanies high ambient air temperature since considerable moisture is contained in the air taken into the compressor. Even at low ambient air temperatures moisture is contained in the air taken into the compressor. The moisture vaporizes due to the heat of compression and subsequently condenses in the compressed air system downstream of the compressor. In addition to moisture, the air taken into the compressor contains dust and dirt particles. Elimination of both solid and liquid contaminants from the air in a compressed air system is important, but it is expensive since known devices for accomplishing this result are large and cumbersome and difficult to maintain. Additionally, known devices are relatively inefficient since they use ram air to cool the heated compressed air and their efficiency varies with the speed of the vehicle.

The purification unit of my invention may be incorporated into an existing vehicle compressed air system between the air compressor and the service reservoir and replaces the normal supply reservoir. The use of this unit insures that clean dry air is supplied to the service reservoir and consequently to the remainder of the system. My unit does not rely on ram air for cooling and is highly efficient regardless of the vehicle operating conditions.

The apparatus of my invention cools air supplied by a compressor and removes both solid and liquid contaminants from that air. The unit includes a positively driven fan at the forward end which forces atmospheric cooling air through a heat transfer section regardless of the rate of movement of the vehicle. As the compressed air temperature decreases in the heat transfer section, oil and water vapor contained therein condense. The heat transfer section includes a downwardly inclined tortuous flow path for the compressed air and the condensate continuously flows downwardly along this path to the bottom of the heat transfer section. The continuous downward flow of the condensate tends to discourage freezing of the liquid in cold weather and entrapped solid contaminants are carried to the bottom of the heat transfer section. The tortuous flow path for the compressed air exposes that air to maximum contact with surfaces cooled by the forced atmospheric air to achieve good heat transfer. The compressed air temperature is lowered to within about 5° F of the ambient air temperature in the heat transfer section. The oil and water condensate in the bottom of the heat transfer section passes, along with air, into the bottom of an expansion and filtration section.

The expansion and filtration section of my unit has a sump at the bottom which drains into a dump valve to permit removal of liquid and entrapped solids from the sump. The dump valve opens during each cyle of the compressor to avoid a buildup of back pressure in the compressor and the compressor discharge line, and accumulated liquid and entrapped solid particles drain from the sump when the valve is open. A supply reservoir section is connected with the expansion and filtration section, and this reservoir section acts as an additional expansion chamber to further dissipate the heat of compression from the air and permit removal of additional liquid. The reservoir section is connected to a drying section containing a desiccant to remove any residual moisture which may remain in the air. The drying section also serves as a further expansion chamber and has a sump with a dump valve at the bottom thereof to permit liquid to drain from the sump.

My invention is installed in a compressed air system including a compressor having a governor responsive to the air pressure in the system to control an actuator on the compressor to maintain the air pressure in the system between about 95 psi and 130 psi. A pressure switch is located in the compressor discharge line intermediate the compressor and the unit of my invention to control the supply of forced cooling air passing to the unit.

The objects of my invention are more fully set forth in connection with the accompanying drawings in which:

FIG. 1 is a diagrammatic representation of a part of a compressed air system including my invention;

FIG. 2 is a fragmental sectional view illustrating the purification unit of my invention;

Figure 3:
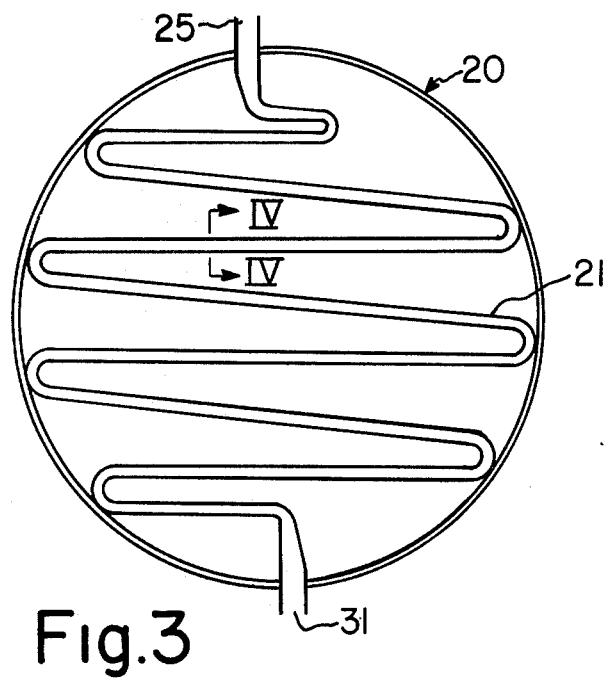
FIG. 3 is a section on line III—III of FIG. 2.

With specific reference to FIG. 1 of the drawings, a standard compressed air system incorporating my invention includes an air compressor 1 having an actuator 2 controlled by a governor 3. The compressor supplies air under pressure to a discharge line 4 having a line filter 5 and a pressure switch 6. The system includes a service reservoir R to receive and store compressed air for subsequent use in the system to operate air actuated devices. The purification unit of my invention is connected in the system downstream of line filter 5 and upstream of service reservoir R. Pressure switch 6 is operated in accordance with the pressure of the air discharged from the compressor, and when the compressor is operating, the switch actuates drive means in the purification unit for a purpose to be described.

In order to maintain the air pressure in the system within a desired range of about 95 psi –130 psi, governor 3 controls actuator 2 which starts and stops the compressor in response to the air pressure within the system. The governor and the actuator and the operation thereof are well known to those skilled in the art and form no part of the invention. The line filter 5 is located upstream of pressure switch 6 to remove relatively large solid particles from the compressed air before that air passes to switch 6. The line filter is conventional and has a replaceable filter cartridge.

As shown in FIG. 2 of the drawings, the purification unit is divided into a plurality of juxtaposed serially connected sections. The sections are located within a chamber having an inlet end, an outlet end and an annular connecting wall. While the chamber is shown as being cylindrical, it should be understood that the configuration is not critical and other configurations may be used. A standard 12 volt electric motor 7 having a shaft 8 carrying a multi-blade fan 9 is mounted at the inlet end of the unit on a spider 10 carried by motor cover 13. The inlet end of the chamber is closed by cylindrical spaced substantially parallel end walls 11 and 12 supporting the motor cover 13. The end walls are welded to annular wall 17, and the motor cover is welded to the end walls. A ring of spaced air inlet ports 14 is formed adjacent to the outer periphery of end wall 11, and a ring of spaced air inlet ports 15 is formed adjacent to the periphery of the central opening in end wall 12. Fan 9 brings atmospheric air into the unit through ports 14 and 15 and forces the air through a heat transfer section 20 and out of the unit through air discharge ports 16 which are located in annular wall 17 of the chamber downstream of the heat transfer section. It is important that the ring of inlet ports 14 in outer wall 11 and the ring of inlet ports 15 in inner wall 12 are radially and axially offset since the air passing through ports 14 contacts inner wall 12 which acts as a deflecting baffle for dirt particles contained in the air so that the air passing into the unit through ports 14 is relatively free from dirt particles. An opening 19 is located in annular wall 17 between the end walls and at the lowermost point around the circumference of the chamber to permit dirt particles to pass out of the chamber. It will be understood by those skilled in the art that an air motor may be substituted for electric motor 7 to drive fan 9, and such permits elimination of pressure switch 6.

Figure 4:
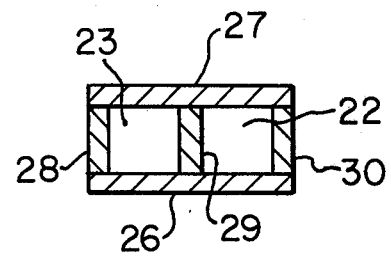
FIG. 4 is a section on line IV—IV of FIG. 3.
Figure 5:
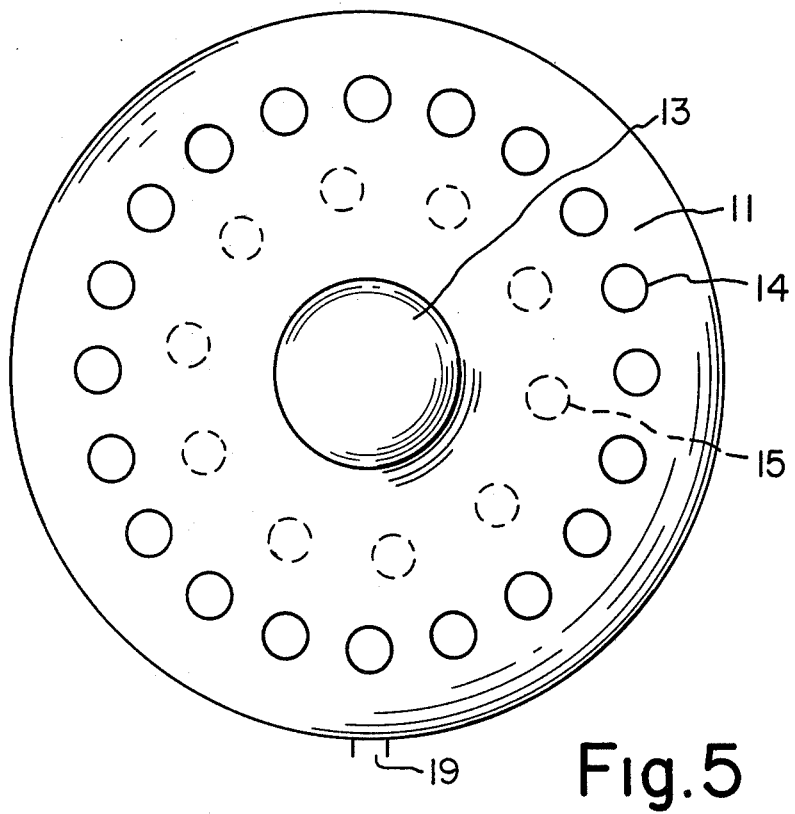
FIG. 5 is an end view of the forward end of the purification unit of the invention.

As shown in FIG. 3 of the drawings, the ends of heat transfer section 20 are open for the passage of cooling air, and the interior contains downwardly inclined tortuous passageway 21 having separate passages 22 and 23 as shown in FIG. 4. Air from the discharge line 4 of the compressor enters inlet 25 at the top of section 20 and travels along passages 22 and 23 to an outlet 31 at the bottom of section 20. The passages 22 and 23 are constructed from spaced parallel metal members 26 and 27 and metal spacer members 28, 29 and 30. The members are welded together to form the two passages, bent into the shape shown in FIG. 3 and inserted into the cylindrical shell of the heat transfer section to provide a large heat transfer surface area. Compressed air passes through passages 22 and 23 and the atmospheric air forced over the heat transfer surfaces dissipates the heat which has been imparted to the air during compression. As the air passes downwardly through passages 22 and 23, oil and water vapor contained therein condenses on the metal surfaces as the air cools, and the condensate flows by gravity to outlet 31 at the bottom of section 20 and carries entrapped solid particles with it.

The cooled air and the condensate with entrapped solids flow through outlet 31 and conduit 32 to an inlet 33 located above a sump at the bottom of expansion and filtration section 34. A screen is located at the bottom of section 34 above inlet 33, and a plastic mesh filter material 35 is supported above the screen to filter out liquid as air flows upwardly through section 34 to an outlet 36 at the upper end of the section. As the air passes through section 34, substantially all of the entrained oil is deposited on mesh 35 and up to about 70 percent of the water is removed. The liquid and entrained solids pass into the sump at the bottom of section 34 and pass through an outlet 37 into a valve 38 having an outlet 39. Valve 38 is a single seat valve which opens completely to drain the sump during the non-cycling period of the air compressor.

Air passing through outlet 36 flows through a conduit 40 which is connected with an inlet 41 in a supply reservoir section 42. The reservoir section 42 actually replaces the storage reservoir in known systems. A one-way check valve 43 is located in conduit 40 to control the flow of air between section 34 and reservoir section 42. Check valve 43 acts as a positive seal between section 34 and reservoir 42 to maintain the desired air pressure in the reservoir. Air passing into reservoir section 42 expands, and there will be additional liquid deposited at the bottom of the reservoir section. A standard hand operated drain valve 44 is located at the bottom of reservoir section 42 to permit liquid to be drained from the reservoir if there is an accumulation.

Air passes out of reservoir section 42 through outlet 45 into the bottom of a drying section 50 containing a commercial chemical or physical desiccant of well known composition which removes residual water which may remain in the compressed air. A screen 51 is located above inlet 45 to support the desiccant, and a fill cap 56 with an inlet 58 is located at the top of section 50 for adding desiccant as required. The liquid passes through an outlet 52 in the bottom of section 50 into a dump valve 53 having an outlet 54. The valve 53 has a double seat so that when the bottom seat is open to permit drainage, the top seat is closed to maintain pressure in reservoir section 42 and vice versa. Clean dry air passes out of section 50 through either an outlet 55 which connects with a conduit 57 leading to service reservoir R or outlet 62 which connects with a conduit 63 which returns air to governor 3 to control actuator 2 on compressor 1. A check valve 59 is located in conduit 57 between the purification unit and reservoir R to maintain pressure in reservoir R.

As explained heretofore, valves 38 and 53 permit removal of liquid and entrained solids when they are open. Valves 38 and 53 are connected by a conduit 60 and valve 38 is connected to governor 3 by a conduit 61, and the valves are controlled in response to the governor. The valves are considered as being open when liquid and entrapped solids pass out of the unit through discharge ports 39 and 54 along with the expulsion of some air from valve 38. Valve 38 is located upstream of check valve 43, and the expulsion of air therefrom during the noncycling period of the compressor does not affect the air pressure in reservoir section 42.

My invention accomplishes the desired purification of the compressed air by first lowering the temperature of the air from the range of approximately 350° F to 400° F to a temperature close to ambient and removing a portion of the water and oil vapors by condensation. The cooled air is expanded and simultaneously filtered to remove additional liquid. The air is further expanded followed by contact with a desiccant to remove any remaining water by chemical absorption. I have found that my novel method of treating the air discharged from an air compressor insures that the air can be utilized to actuate devices in an air pressure system without damage to the devices which extends the life of the system and increases the safety of vehicle operation. As stated heretofore, it is important that the compressed air supplied to the system is free of both solid and liquid contaminants and that the temperature thereof is close to ambient. If the air is not clean and close to ambient temperature, serious damage may be caused to the air actuated devices which results in dangerous safety conditions as well as considerable expense and downtime to repair or replace the damaged parts.

The present invention provides an improvement in a compressed air system which is particularly applicable to vehicles wherein it is necessary to have extended periods without maintenance of the system. For safety purposes it is important that the compressed air system of a vehicle function fully and without fail between routine maintenance operations, and my unit may be installed in existing systems to accomplish this result. The unit of my invention is both efficient and inexpensive to construct, install and maintain. The unit is relatively light in weight and, therefore, does not add appreciably to the vehicle weight.

Having described a preferred embodiment of my invention, it should be understood that it may be otherwise embodied within the scope of the appended claims.

I claim:

1. An air purification unit for use in a compressed air system including an air compressor, a discharge line from said air compressor, a filter in said discharge line and a compressed air service reservoir; said air purification unit comprising a unitary chamber means, closure means at the inlet end of said chamber means, said closure means formed with a plurality of air inlet openings; a plurality of serially connected sections located within said unitary chamber means; said sections including a heat transfer section spaced from said closure means, a filter and expansion section, a supply reservoir section and a drying section; inlet means and outlet means for each of said sections, the inlet means of said heat transfer section adapted to be connected to the discharge line from the air compressor downstream of the filter and the outlet means of said heat transfer section connected with the inlet means of said filter and expansion section, the outlet means of said filter and expansion section connected with the inlet means of said supply reservoir section, the outlet means of said supply reservoir section connected with the inlet means of said drying section, and the outlet means of said drying section adapted to be connected to the service reservoir in the compressed air system; and positively driven fan means located in said chamber means between said closure means and said heat transfer section and a plurality of air outlet openings in said chamber means downstream of said heat transfer section, said fan means moving atmospheric air through said air inlet openings into said chamber means, past said heat transfer section and through said air outlet openings; whereby compressed air from the air compressor flows through said air purification unit wherein the temperature of the compressed air is decreased and substantially all of the liquid and solid contaminants are removed from the compressed air.

2. The air purification unit of claim 1 wherein said closure means located at the inlet end of said chamber means has first and second spaced circular members, said air inlet openings formed in said circular members, the air inlet openings in said first circular member being radially and axially offset relative to the air inlet openings in said second circular member, whereby atmospheric air passes through the air inlet openings in said first circular member and contacts said second circular member prior to passing through the air inlet openings in said second circular member and solid particles carried by the atmospheric air are deflected by the contact with said second circular member.

3. An air purification unit as set forth in claim 1 wherein said heat transfer section includes means forming at least one downwardly inclined continuous tortuous passage extending between said inlet means of said heat transfer section and said outlet means of said heat transfer section, a sump connected with said outlet means of said heat transfer section and a drain valve connected with said sump, whereby compressed air passing through said passage is cooled to condense vapor contained therein and the condensate flows along said downwardly inclined passage through said outlet means of said heat transfer section into said sump and is discharged through said drain valve.

4. An air purification unit as set forth in claim 3 wherein said means forming at least one passage consists of a first pair of spaced parallel members connected at their edges by a second pair of spaced parallel members located perpendicularly to said first pair of members, and a member extending between and parallel with said second pair of members to form a pair of downwardly inclined tortuous passages for the compressed air.

5. An air purification unit as set forth in claim 1 wherein said filter and expansion section contains a mass of mesh filter material located between said inlet means and said outlet means, whereby substantially all of the oil in the compressed air is retained upon said mass of mesh filter material and a portion of the water in the compressed air is retained upon said mesh filter material as said compressed air passes through said filter and expansion section.

6. An air purification unit as set forth in claim 1 including a conduit connecting said outlet means of said filter and expansion section with said inlet means of said supply reservoir section, and a one-way check valve located in said conduit, whereby said check valve provides a seal between said filter and expansion section and said supply reservoir section to maintain the compressed air in said supply reservoir section at the desired pressure.

7. Apparatus as set forth in claim 1 wherein said drying section contains a desiccant for removing residual moisture from said compressed air, a sump at the bottom of said drying section adjacent to said drying section inlet means, and a two-way drain valve connected with said sump for draining liquid therefrom.

8. An air purification unit for use in a compressed air system having an air compressor, a discharge line from said air compressor, a filter in said discharge line and a compressed air service reservoir; said unit comprising a unitary chamber means; a plurality of serially connected sections all located within said unitary chamber means; said sections including a heat transfer section, a filter and expansion section, a supply reservoir section having a substantially greater volume than said separator section to form an expansion chamber to permit expansion of compressed air passing into said supply reservoir section and a drying section; inlet means and outlet means for each of said sections, the inlet means of said heat transfer section adapted to be connected to the discharge line from the air compressor downstream of the filter and the outlet means of said heat transfer section connected with the inlet means of said filter and expansion section, the outlet means of said filter and expansion section connected with the inlet means of said supply reservoir section, the outlet means of said supply reservoir section connected with the inlet means of said drying section, and the outlet means of said drying section adapted to be connected to the service reservoir in the air compressor system; and positively driven fan means located within said chamber upstream of said heat transfer section to force atmospheric air into said chamber past said heat transfer section; whereby compressed air from the air compressor flows through said air purification unit wherein the temperature of the compressed air is decreased and substantially all of the liquid and solid contaminants are removed from the compressed air.

* * * * *